United States Patent
Benigno

(10) Patent No.: US 9,337,676 B2
(45) Date of Patent: May 10, 2016

(54) OUTLET ENCLOSURE FOR DEVICE CHARGERS

(71) Applicant: Joseph Benigno, Tenafly, NJ (US)

(72) Inventor: Joseph Benigno, Tenafly, NJ (US)

(73) Assignee: Joseph Benigno, Tenafly, NJ (US)

( * ) Notice: Subject to any disclaimer, the term of this patent is extended or adjusted under 35 U.S.C. 154(b) by 0 days.

(21) Appl. No.: 14/148,997

(22) Filed: Jan. 7, 2014

(65) Prior Publication Data

US 2015/0194832 A1   Jul. 9, 2015

(51) Int. Cl.
*G01R 31/02* (2006.01)
*G01R 31/327* (2006.01)
*H02J 7/00* (2006.01)
*H02J 7/02* (2016.01)

(52) U.S. Cl.
CPC ............ *H02J 7/0044* (2013.01); *H02J 7/0042* (2013.01); *H02J 7/02* (2013.01); *H02J 7/0027* (2013.01)

(58) Field of Classification Search
CPC ..... G01R 31/02; G01R 31/327; H02J 7/0044; H02J 7/02; H02J 7/0042; H02J 7/0027
USPC .................... 320/111, 107; 439/373; 324/424
See application file for complete search history.

(56) References Cited

U.S. PATENT DOCUMENTS

| | | | | |
|---|---|---|---|---|
| 2,510,745 | A * | 6/1950 | Kilgore ........................... | 174/67 |
| 4,083,618 | A * | 4/1978 | Busch, Jr. ...................... | 439/147 |
| 5,168,235 | A * | 12/1992 | Bonner ......................... | 324/508 |
| 5,539,821 | A * | 7/1996 | Blonder ........................ | 379/446 |
| 5,547,390 | A * | 8/1996 | Laherty ......................... | 439/373 |
| 5,847,541 | A * | 12/1998 | Hahn .............................. | 320/111 |
| 5,989,052 | A * | 11/1999 | Fields et al. ................... | 439/373 |
| 6,127,803 | A * | 10/2000 | Wang et al. .................... | 320/114 |
| 6,309,239 | B1 * | 10/2001 | Johnston ........................ | 439/373 |
| 6,699,060 | B1 * | 3/2004 | Scott .............................. | 439/373 |
| 6,727,677 | B1 * | 4/2004 | Bouskila ........................ | 320/107 |
| 6,844,494 | B1 * | 1/2005 | Nevins ........................... | 174/53 |
| 7,056,145 | B2 * | 6/2006 | Campbell et al. ............. | 439/373 |
| 7,097,474 | B1 * | 8/2006 | Naylor ........................... | 439/135 |
| 7,183,743 | B2 * | 2/2007 | Geiger ........................... | 320/111 |
| 7,400,476 | B1 * | 7/2008 | Hull, Jr. ............... | H02H 11/002 361/42 |
| 7,505,237 | B2 * | 3/2009 | Baxter ................ | H02H 11/005 361/42 |
| 7,652,452 | B2 * | 1/2010 | Mori et al. ..................... | 320/107 |
| 8,217,528 | B2 * | 7/2012 | Fleisig ............................ | 307/11 |
| 8,222,773 | B2 * | 7/2012 | De Iuliis et al. ................ | 307/151 |

(Continued)

FOREIGN PATENT DOCUMENTS

EP           228263 A1 *  9/2010
WO   WO2008/155644 A2 * 12/2008

*Primary Examiner* — Patrick Assouad
*Assistant Examiner* — Lamarr Brown
(74) *Attorney, Agent, or Firm* — Troutman Sanders LLP

(57) ABSTRACT

An enclosure includes a housing adapted to cover at least the body of a power adaptor of a device charger. The housing has an opening to allow access to the charging wire port of the power adaptor. The opening is smaller than the power adaptor, so the power adaptor cannot be removed from the housing through the window. Further, the window can permit the charging wire plug to be plugged into and removed from the charging wire port while the power adaptor remains in the housing. The housing further includes charging wire trap which captures the charging wire. The charging wire trap holds the wire between the charging wire plug and the device interface. The charging wire trap is sized to not allow either the charging wire plug or the device interface to pass through it. The enclosure can also include an anchor point attached to the housing.

8 Claims, 5 Drawing Sheets

(56) References Cited

U.S. PATENT DOCUMENTS

| | | | |
|---|---|---|---|
| 8,647,142 B1* | 2/2014 | Kershaw ................... | 439/373 |
| 8,928,276 B2* | 1/2015 | Kesler et al. ............... | 320/108 |
| 2004/0196000 A1* | 10/2004 | Wei .......................... | 320/111 |
| 2005/0104555 A1* | 5/2005 | Simmonds-Short ........ | 320/107 |
| 2005/0202709 A1* | 9/2005 | Campbell et al. .......... | 439/373 |
| 2006/0223359 A1* | 10/2006 | O'Connell et al. ......... | 439/373 |
| 2006/0264094 A1* | 11/2006 | Young ....................... | 439/501 |
| 2008/0204951 A1* | 8/2008 | Hull .................. | H02H 11/002 361/49 |
| 2008/0272258 A1* | 11/2008 | Wysoczynski ............. | 248/309.1 |
| 2008/0284371 A1* | 11/2008 | Hsu .......................... | 320/111 |
| 2009/0033149 A1* | 2/2009 | Patel ......................... | 307/10.1 |
| 2009/0179615 A1* | 7/2009 | Amron ...................... | 320/114 |
| 2009/0267564 A1* | 10/2009 | Gerber ....................... | 320/114 |
| 2009/0309542 A1* | 12/2009 | Hung et al. ................. | 320/111 |
| 2010/0120276 A1* | 5/2010 | White ........................ | 439/148 |
| 2010/0315036 A1* | 12/2010 | Liao .......................... | 320/107 |
| 2011/0084651 A1* | 4/2011 | Caskey et al. .............. | 320/107 |
| 2011/0187323 A1* | 8/2011 | Gourley ..................... | 320/111 |
| 2011/0227535 A1* | 9/2011 | Caskey et al. .............. | 320/111 |
| 2012/0049800 A1* | 3/2012 | Johnson et al. ............. | 320/111 |
| 2012/0139484 A1* | 6/2012 | Gunderman et al. ........ | 320/108 |
| 2013/0020996 A1* | 1/2013 | Kirtley et al. .............. | 320/113 |
| 2013/0113420 A1* | 5/2013 | Majoris, Jr. ................. | 320/107 |
| 2013/0300348 A1* | 11/2013 | Schwartz et al. ........... | 320/107 |
| 2013/0300366 A1* | 11/2013 | Liu ........................... | 320/111 |
| 2014/0094044 A1* | 4/2014 | Ward ......................... | 439/92 |
| 2014/0103179 A1* | 4/2014 | Lipke et al. ................. | 248/231.91 |
| 2014/0175031 A1* | 6/2014 | Roberts ...................... | 211/26.2 |
| 2014/0354214 A1* | 12/2014 | Phelps et al. ................ | 320/107 |

\* cited by examiner

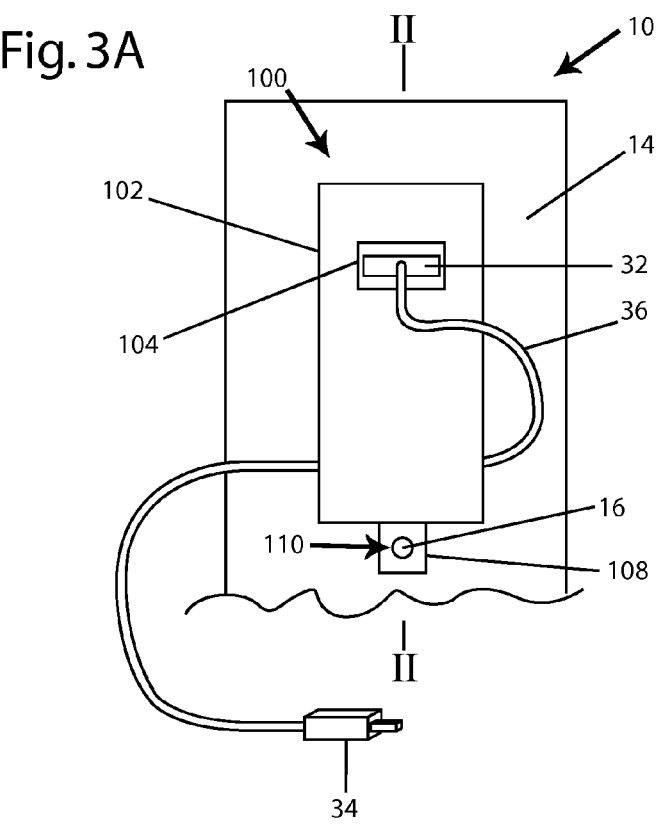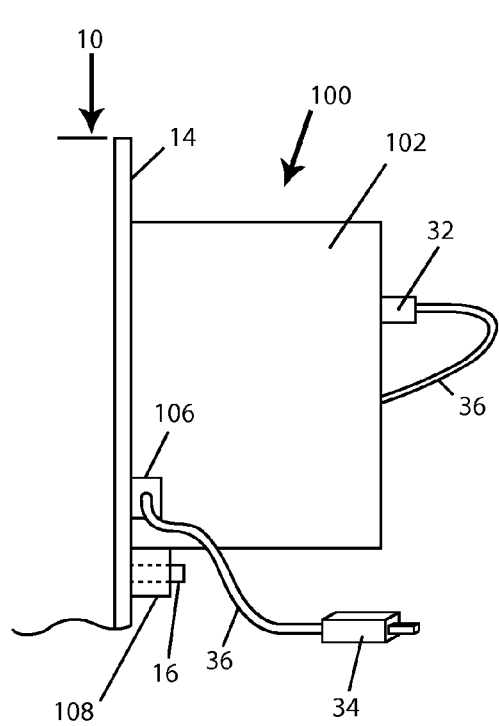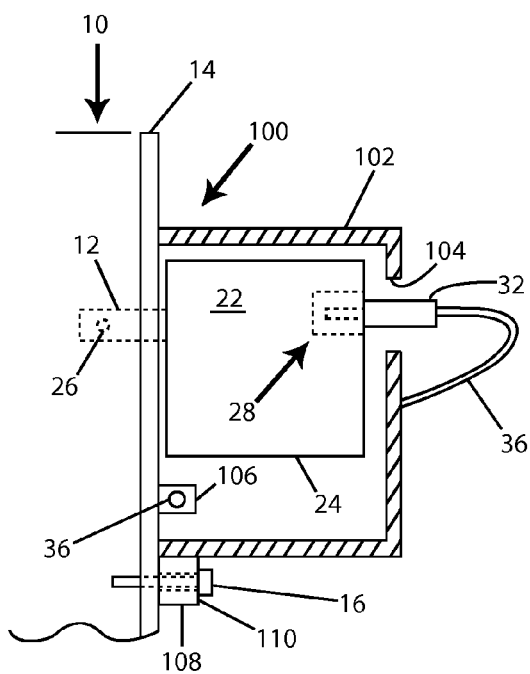

OUTLET ENCLOSURE FOR DEVICE CHARGERS

FIELD OF THE INVENTION

The present invention relates to power outlet enclosures to secure both the power adaptor and charging wire used to charge electronic devices.

BACKGROUND

The number and types of electronic devices that are commercially available have increased tremendously the past few years, and this increase shows no signs of abating. Many of these devices have power adaptors and charging wires (known collectively as device chargers) specific to device or brand of devices. These adaptors and wires are sometimes sold separate from the devices and are also costly in their own right.

Due to the need for device chargers, both the wire and adaptors can be removed by people other than by their owner to assist in charging another device or to free up the outlet to the device charger for a different electronic device. These device chargers may not be returned to their owners promptly, or at all.

Thus, there is a need for a simple way to secure a device charger, both the power adaptor and power wire, to prevent their removal from a power outlet.

SUMMARY

An example of an enclosure of the present invention includes a housing adapted to cover at least the body of the power adaptor of the device charger. The housing can have an opening to allow access to the charging wire port of the power adaptor. The opening is smaller than the power adaptor, so the power adaptor cannot be removed from the housing through the window. Further, the window can permit the charging wire plug to be plugged into and removed from the charging wire port while the power adaptor remains in the housing.

The housing can further include charging wire trap which is adapted to capture the at least one wire of the charging wire. The charging wire trap holds the wire between the charging wire plug and the device interface. The charging wire trap can be sized to not allow either the charging wire plug or the device interface to pass through it. Additionally, the enclosure can include an anchor point attached to the housing. The anchor point can have a fastener hole therethrough.

When the enclosure in use with outlet and device charger the power adaptor is plugged into the socket using prongs. The fastener can be removed from the faceplate and then the housing is placed over the power adaptor and the anchor point and the fastener hole are aligned with the fastening point on the faceplate. As the housing is being placed, the wire of the charging wire is run through the charging wire trap. The fastener (or a different fastener) is passed through the fastener hole in the anchor point and the fastener is secured back to the outlet. This secures the enclosure to the outlet and covers the power adaptor and wire.

In this example, the charging wire trap is a small gap on the outlet side of the housing, on both sides of the housing. As the housing is placed onto the faceplate, the wire passes through the housing but is trapped between the faceplate and the housing. The charging wire trap can be large enough to allow the wire to move freely, but is small enough to prevent either the charging wire plug or the device interface from passing through the trap. This allows the wire to move freely along its length but not be removed from under the enclosure.

As also illustrated, the opening can align with the charging wire port to allow the charging wire plug to be removed and replaced at will. This allows a different charging wire to use the power adaptor, but still secures the original charging wire to the enclosure.

Other examples are an enclosure having an expanded charging wire trap allowing multiple charging wires to be secured in the housing but the trap still prevents removal of the wires as noted above. An expanded enclosure can cover multiple device chargers and can also cover two or more sockets of the outlet. The enclosure can have multiple charging wire traps along with multiple openings to accommodate the multiple device chargers. Further, housing enclosure can have multiple anchor points to secure the enclosure to the outlet.

Charging wire traps can be removably fastened to the outside of the housing. The fastening can be done with fasteners, adhesives, or molded interlocking parts. The fasteners can be standard or have uncommon heads so special tools are required to remove them. The charging wire trap can be integral to the housing allowing easy removal and replacing of the wire located on the external surface of the enclosure. Another example can integrate the enclosure to the faceplate. All of the foregoing examples can be used interchangeably, to some extent. Enlarged enclosures can be used with enlarged or external wire traps, etc.

Further example of an enclosure for a device charger plugged into an outlet is below. The outlet can have a faceplate and the device charger can include a power adaptor and a charging wire. The enclosure can have a housing configured to enclose the power adaptor and the housing can have an opening permitting one end of the charging wire to contact the power adaptor. The opening can also prevent the power adaptor from passing through the opening. The housing can additionally have a wire trap used to secure the charging wire. The enclosure also has an anchor point fixed to the housing and configured to attach the housing to the outlet.

The opening of the enclosure can permit the charging wire to connect and disconnect to the power adaptor without removing the charging wire from the wire trap. The anchor point can be configured to attach the housing to the faceplate. The wire trap can secure multiple charging wires. The wire trap can be a gap in the housing or external to the housing. The housing can enclose multiple power adaptors and if it does so, can have multiple openings equal to the number of power adaptors.

As described, the housing can form a hollow interior to contain or partially contain the power adaptor. Another example can be that the housing is formed similar to straps or bands meeting at a common anchor point. This example can reduce the amount of materials required to form the enclosure. The housing can be made of any acceptable material, preferable an electrically insulating material, that can be secured to an outlet and secure the power adapter while allowing access to the charging wire port. Note that the wire trap can be separate from the opening.

BRIEF DESCRIPTION OF THE DRAWINGS

This invention is described with particularity in the appended claims. The above and further aspects of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

The drawing figures depict one or more implementations in accord with the present teachings, by way of example only, not by way of limitation. In the figures, like reference numerals refer to the same or similar elements.

FIG. 3A is a front view of an example of the enclosure in use;

FIG. 3B is a side view of an example of the enclosure in use;

FIG. 3C is a side cross-section along line II-II of an example of the enclosure in use;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

An example of the invention is described herein below with reference to the Figures.

Figure 1:
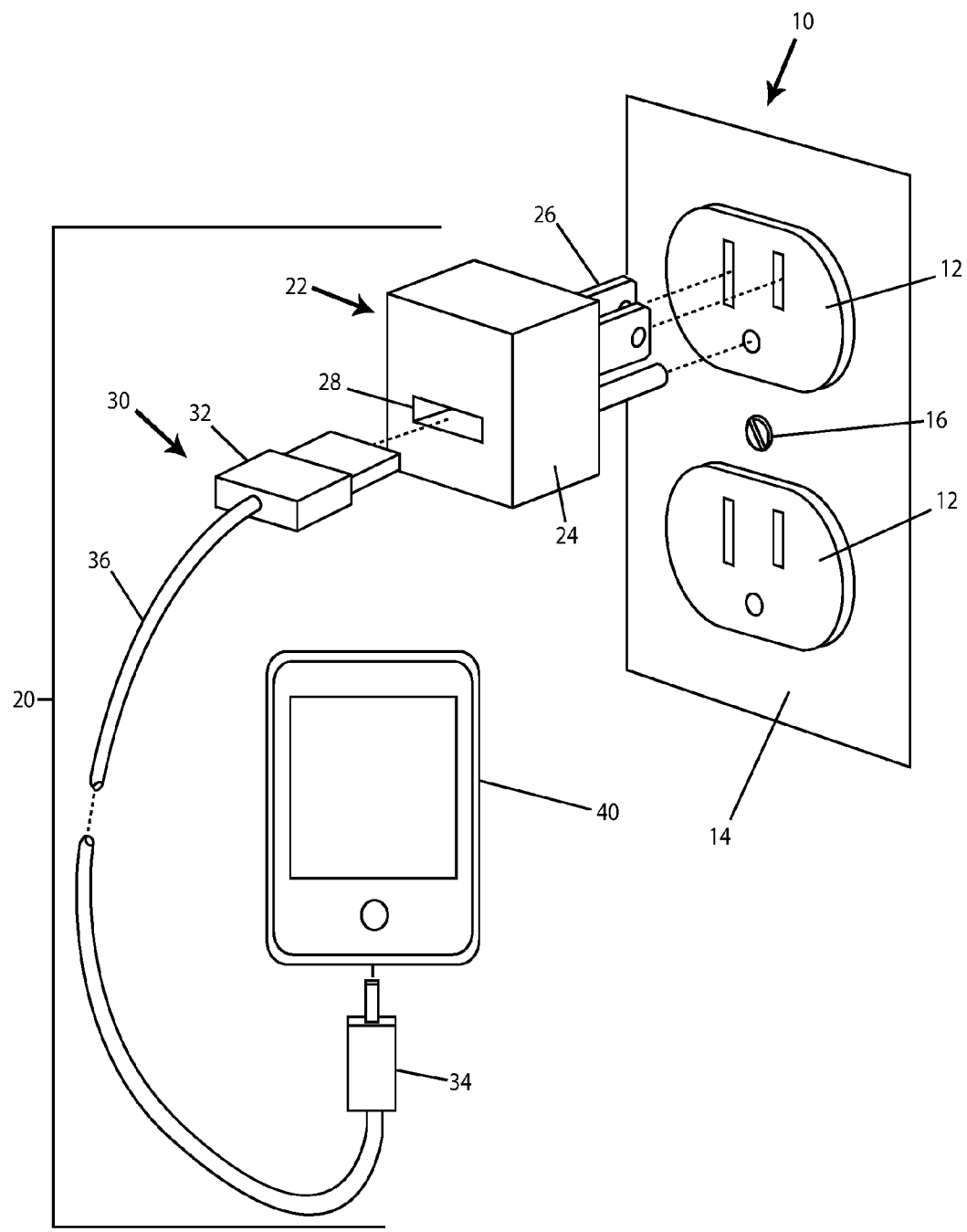
FIG. 1 is a view of an example of a power outlet, device charger and device.

FIG. 1 illustrates an example of a power outlet 10, a device charger 20, and an electronic device 40. A power outlet 10 typically includes one or more sockets 12 to receive a prong of a power adaptor. The sockets are typically surrounded by a faceplate 14 secured by at least one fastener 16. The device charger 20 typically can have a power adaptor 22 and a charging wire 30. The power adaptor 22 can include a body 24 having at least two prongs 26 on one end and a charging wire port 28 on another end. The at least two prongs 26 can enter the socket 12 of the power outlet 10 to transfer electricity to the device 40. The charging wire port 28 can allow a charging wire 30 to be plugged into and removed from the power adaptor 22. The charging wire 30 typically has two ends. A first end has the charging wire plug 32 to interface with the charging wire port 28. This electrically connects the power adaptor 22 with the charging wire 30. The other end of the charging wire 30 has a device interface 34 that can electrically connect with the device 40 to transmit at least electrical energy. Between the two ends is a wire 36 itself.

There are many variants to the power outlet 10, device charger 20, and electronic device 40, as known to those of ordinary skill. Power outlets 10 can be configured differently depending on the amount of voltage being delivered and the standards within individual countries. The example illustrated is a U.S. 120V ground outlet.

Device chargers 20 can also be configured differently. The number and configuration of prongs 26 can be changed according to the power outlet 10 configurations in each country. The size and shape of the body 24 can also vary depending on the style of the manufacturer and the capacity of the power adaptor 22. Further, the charging wire port 28 can be configured to match the charging wire plug 32 on the end of the charging wire 30 and most electronic device 40 manufacturers have different device interfaces 34. In certain examples, the device interface 34 may not be a physical connection to the electronic device 40 but it is the point at which power is transmitted to the device 40. Additionally, the charging wire 30 can also be capable of transmitting data, but at a minimum it can transmit power. The present example illustrated is an Apple 5W power adaptor with a USB charging wire port 28. The charging wire 30 has a USB connection on one end and a Lightening connector on the other.

Electronic devices 40 also come in many forms, including smart phones, cellular telephones, computing tablets, computing pads, audio and video players, portable gaming systems, portable computers, laptops, and wireless devices including earpieces, headphones, LAN adaptors, keyboards, pointing devices, human/machine interfaces, etc. The present invention is designed to be used with any type of electronic 40 or device charger 20.

Figure 2A:
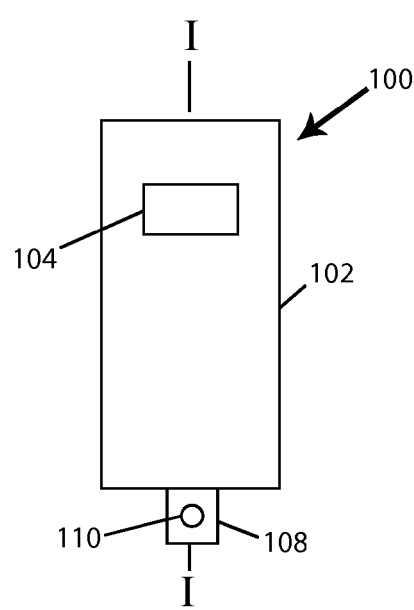
FIG. 2A is a front view of an example of the enclosure of the present invention.
Figure 2B:
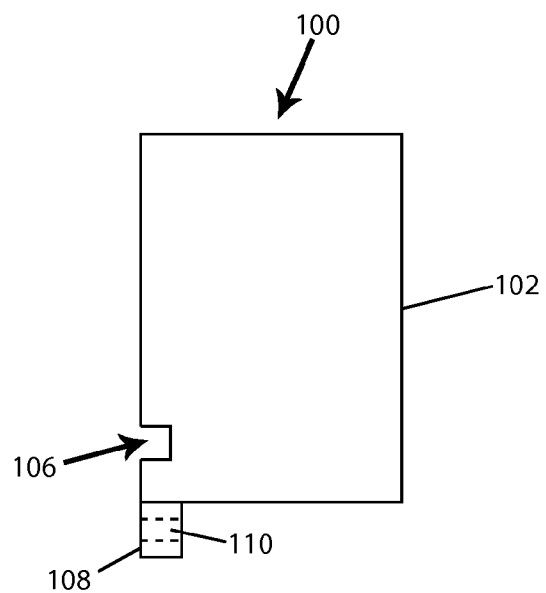
FIG. 2B is a side view of an example of the enclosure of the present invention.
Figure 2C:
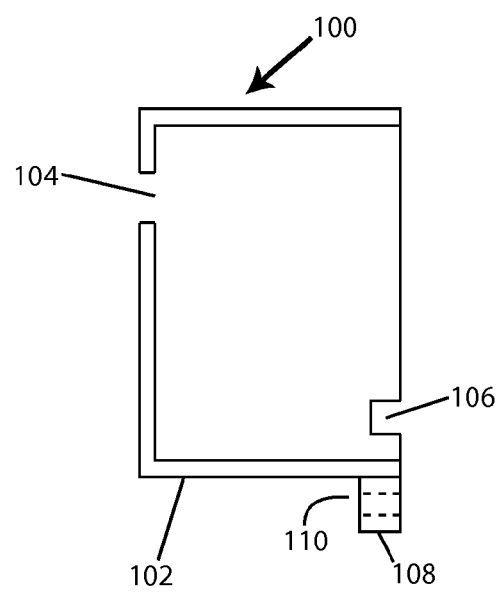
FIG. 2C is a side cross-section along line I-I of an example of the enclosure of the present invention.

An example of an enclosure 100 of the present invention is illustrated in FIG. 2A-2C. The enclosure 100 includes a housing 102 adapted to cover at least the body 24 of the power adaptor 22 of the device charger 20. The housing 102 can have an opening 104 to allow access to the charging wire port 28 of the power adaptor 22. The opening 104 is smaller than the power adaptor 22, so the power adaptor 22 cannot be removed from the housing 102 through the window 104. Further, the window 104 can permit the charging wire plug 32 to be plugged into and removed from the charging wire port 28 while the power adaptor 22 remains in the housing 102.

The housing 102 can further include charging wire trap 106 which is adapted to capture the at least one wire 36 of the charging wire 30. The charging wire trap 106 holds the wire 36 between the charging wire plug 32 and the device interface 34. The charging wire trap 106 can be sized to not allow either the charging wire plug 32 or the device interface 34 to pass through it. Additionally, the enclosure 100 can include an anchor point 108 attached to the housing 102. The anchor point 108 can have a fastener hole 110 therethrough.

FIGS. 3A, 3B and 3C illustrate an example of the enclosure 100 in use with outlet 10 and device charger 20. As shown, the power adaptor 22 is plugged into the socket 12, using prongs 26. The fastener 16 can be removed from the faceplate 14 and then the housing 102 is placed over the power adaptor 22 and the anchor point 108 and the fastener hole 110 are aligned with the fastening point on the faceplate 14. As the housing 102 is being placed, the wire 36 of the charging wire 30 is run through the charging wire trap 106. The fastener 16 (or a different fastener) is passed through the fastener hole 110 in the anchor point 108 and the fastener 16 is secured back to the outlet 10. This secures the enclosure 100 to the outlet 10 and covers the power adaptor 22 and wire 36.

In this example, the charging wire trap 106 is a small gap on the outlet side of the housing 102, on both sides of the housing 102. As the housing 102 is placed onto the faceplate 14, the wire 36 passes through the housing 102 but is trapped between the faceplate 14 and the housing 102. The charging wire trap 106 can be large enough to allow the wire 36 to move freely, but is small enough to prevent either the charging wire plug 32 or the device interface 34 from passing through the trap 106. This allows the wire 36 to move freely along its length but not be removed from under the enclosure 100.

As also illustrated, the opening 104 can align with the charging wire port 28 to allow the charging wire plug 32 to be removed and replaced at will. This allows a different charging wire to use the power adaptor 22, but still secures the original charging wire 30 to the enclosure 100.

Figure 4:
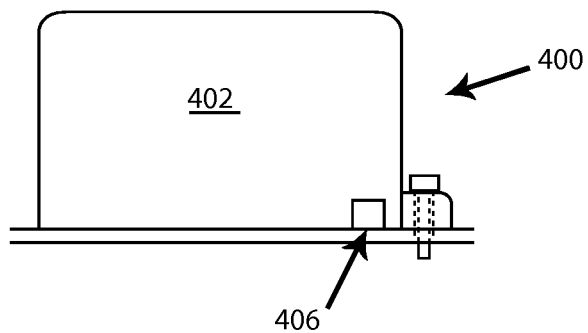
FIG. 4 is a side view of another example of an enclosure.
Figure 5:
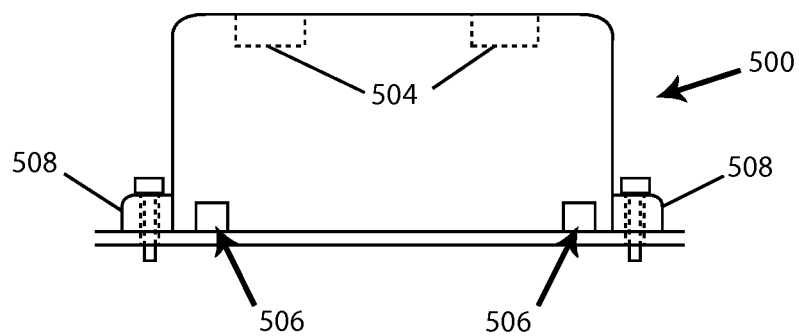
FIG. 5 is a side view of a further example of an enclosure.

Other examples of the enclosure of the present invention are illustrated in FIGS. 4-7. FIG. 4 illustrates an enclosure 400 having an expanded charging wire trap 406 allowing multiple charging wires to be secured in the housing 402 but the trap 406 still prevents removal of the wires as noted above. FIG. 5 illustrates an expanded enclosure 500 that can cover multiple device chargers 20 and can also cover two or more sockets 12 of the outlet. The enclosure 500 can have multiple charging wire traps 506 along with multiple openings 504 to accommodate the multiple device chargers 20. Further, housing enclosure 500 can have multiple anchor points 508 to secure the enclosure 500 to the outlet 10.

Figure 6:
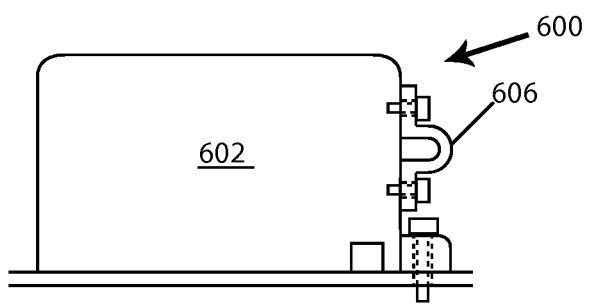
FIG. 6 is a side view of a yet further example of an enclosure.
Figure 7:
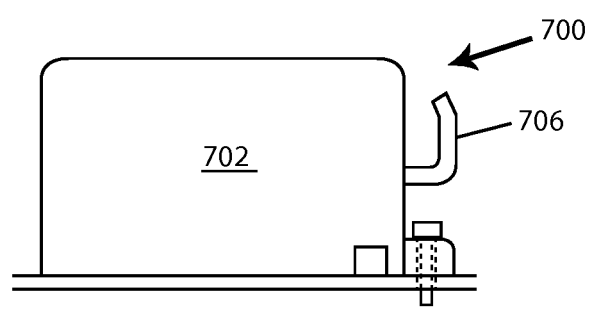
FIG. 7 is a side view of another example of an enclosure.

FIGS. 6 and 7 show different examples of charging wire traps 606, 706. The charging wire trap 606 is removably fastened to the outside of the housing 602. The fastening can be done with fasteners, adhesives, or molded interlocking parts. The fasteners can be standard or have uncommon heads so special tools are required to remove them. FIG. 7 illustrates a charging wire trap 706 integral to a housing 702 allowing easy removal and replacing of the wire located on the external surface of the enclosure 700. Another example can integrate the enclosure to the faceplate. All of the foregoing examples can be used interchangeably, to some extent. Enlarged enclosures can be used with enlarged or external wire traps, etc.

Further example of an enclosure for a device charger plugged into an outlet is below. The outlet can have a faceplate and the device charger can include a power adaptor and a charging wire. The enclosure can have a housing configured to enclose the power adaptor and the housing can have an opening permitting one end of the charging wire to contact the power adaptor. The opening can also prevent the power adaptor from passing through the opening. The housing can additionally have a wire trap used to secure the charging wire. The enclosure also has an anchor point fixed to the housing and configured to attach the housing to the outlet.

The opening of the enclosure can permit the charging wire to connect and disconnect to the power adaptor without removing the charging wire from the wire trap. The anchor point can be configured to attach the housing to the faceplate. The wire trap can secure multiple charging wires. The wire trap can be a gap in the housing or external to the housing. The housing can enclose multiple power adaptors and if it does so, can have multiple openings equal to the number of power adaptors.

As described, the housing can form a hollow interior to contain or partially contain the power adaptor. Another example can be that the housing is formed similar to straps or bands meeting at a common anchor point. This example can reduce the amount of materials required to form the enclosure. The housing can be made of any acceptable material, preferable an electrically insulating material, that can be secured to an outlet and secure the power adapter while allowing access to the charging wire port. Note that the wire trap can be separate from the opening.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. An enclosure for a device charger plugged into an outlet having a faceplate, the device charger including a power adaptor and a charging wire, the enclosure comprising:
   a housing configured to enclose the power adaptor, comprising:
      an opening permitting one end of the charging wire to contact the power adaptor and preventing the power adaptor from passing through the opening; and
      a wire trap securing the charging wire; and
   an anchor point fixed to the housing and configured to attach the housing to the outlet, and
   wherein the opening permits the charging wire to connect and disconnect to the power adaptor without removing the charging wire from the wire trap and with the power adaptor remaining in the outlet.

2. The enclosure of claim 1, wherein the anchor point is configured to attach the housing to the faceplate.

3. The enclosure of claim 1, wherein the wire trap secures multiple charging wires.

4. The enclosure of claim 1, wherein the wire trap is a gap in the housing.

5. The enclosure of claim 1, wherein the wire trap is external to the housing.

6. The enclosure of claim 1, wherein the housing is configured to enclose multiple power adaptors.

7. The enclosure of claim 6, wherein the housing configured to enclose multiple power adaptors further comprises multiple openings equal to the number of power adaptors.

8. An enclosure for a device charger plugged into an outlet having a faceplate, the device charger including a power adaptor and a charging wire, the enclosure comprising:
   a housing having a first side and a second side and configured to enclose the power adaptor, comprising:
      an opening permitting one end of the charging wire to contact the power adaptor and preventing the power adaptor from passing through the opening; and
      a gap in both the first and second sides of the housing acting as a wire trap securing the charging wire by passing the charging wire through the gap in both sides; and
   an anchor point fixed to the housing and configured to attach the housing to the outlet.

* * * * *